E. OLDFIELD.
BALL BEARING.
APPLICATION FILED JULY 17, 1911.

1,051,625.

Patented Jan. 28, 1913.

WITNESSES:
Arthur D. Wilcox.
Madeline D. Ritchie.

EDWIN OLDFIELD,
INVENTOR

By Frank H. Allen
ATTORNEY.

UNITED STATES PATENT OFFICE.

EDWIN OLDFIELD, OF NORWICH, CONNECTICUT.

BALL-BEARING.

1,051,625. Specification of Letters Patent. Patented Jan. 28, 1913.

Application filed July 17, 1911. Serial No. 638,947.

*To all whom it may concern:*

Be it known that I, EDWIN OLDFIELD, a citizen of the United States, residing at Norwich, in the county of New London and State of Connecticut, have invented certain new and useful Improvements in Ball-Bearings, of which the following is a specification.

The object of this invention is to provide a simple, effective and reasonably cheap form of ball bearing of the type which consists essentially of an outer and inner ring whose confronting faces are channeled to provide, an unbroken raceway, and a plurality of balls mounted in said raceway; my immediate purpose being to provide novel means whereby said balls may be inserted in, or removed from, the said raceway.

Figure 1:
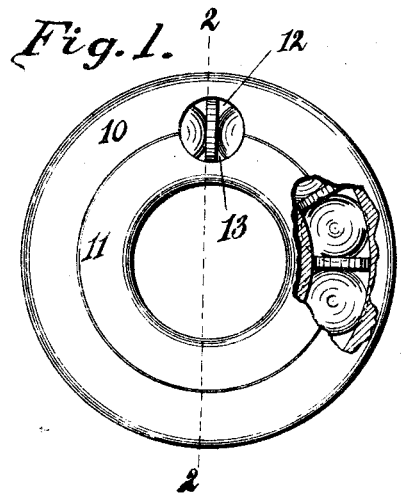
Figure 2:
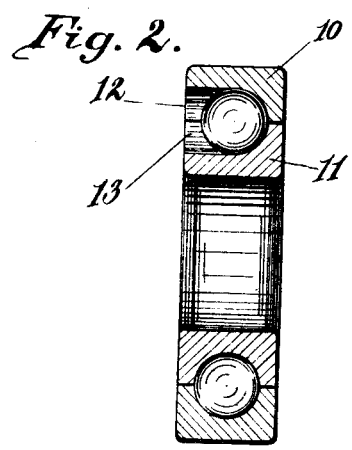
Figure 3:
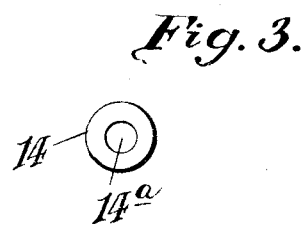
Figure 4:
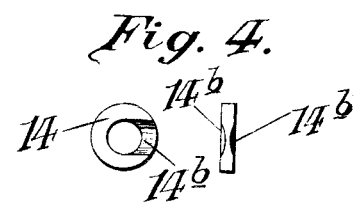
Figure 5:
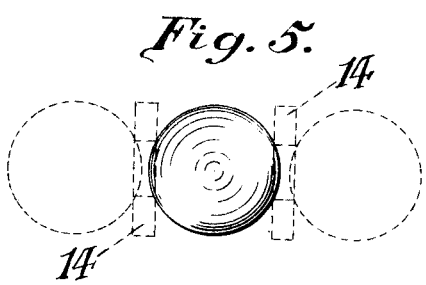

The accompanying drawings illustrate my present improvement, Figure 1 being an end view of a ball bearing embodying said improvement; the ring members being partly broken away to disclose the balls and separators located therein. Fig. 2 is a sectional view taken on the line 2—2 of said Fig. 1. In Fig. 3 I have shown views of two forms of separator disks that may be used in carrying my present invention into effect. Fig. 4 shows face and edge views of a special form of disk which I provide for locking the balls and separators in the raceway, as I shall explain in detail hereinafter. In Fig. 5 I have illustrated, on a relatively enlarged scale, three balls and two separator disks, for the purpose of explaining the interlocking relation of the disks to the balls when the said disks and balls are operatively mounted in the annular raceways.

Referring to these drawings the numerals 10 and 11 indicate, respectively, the outer and inner ring members, the same being arranged in concentric relation to each other, as seen in Fig. 1, and having their confronting faces grooved, as seen in Fig. 2, to provide an annular raceway for a plurality of balls which are inserted in said raceway through a lateral opening 12—13 that is sufficiently large to allow the free passage of the balls therethrough. The balls are separated by disks 14, of approximately the same diameter as the balls; said disks being provided with central openings 14$^a$ which allow the periphery of the balls to enter said opening slightly, as seen in Fig. 5, the disks being however of sufficient thickness to prevent the balls from contacting with each other. When the balls and disks, thus assembled, are mounted in the raceway the disks serve not only to separate the balls but also to prevent the undue lateral deflection of the balls, particularly at the instant when the balls are passing the notches 12 and 13.

In the operation of assembling the parts of my described ball bearing the two ring members 10 and 11 are brought together in concentric relation to each other and they are then adjusted so as to bring the notches 12 and 13 opposite each other, as in Fig. 1, thus providing a circular opening of sufficient size to receive the balls. The balls and separator disks are then inserted (through the said opening) in the raceway; the balls and separators being arranged in alternate relation to each other, as seen in Fig. 1, the last separator disk being forced into place between the balls. I find in practice that, in the operation of thus forcing in the last disk, the previously assembled balls and disks will adjust themselves into close engagement with each other for the instant and, when the last disk snaps into place between the balls, said balls and disks will relax, so to speak, and separate sufficiently to prevent undue frictional resistance when the ball bearing device is in service but will still remain in such close relation to each other that neither the disks nor the balls can escape through the opening 12—13. Should it become necessary, or desirable, to remove the balls, the openings 12—13 are first moved into register with each other, so to provide a circular opening, as in Fig. 1, and one of the disks may then be forced out through said opening by means of a thin set (inserted between the outer and inner rings, at the backside) and a hammer and, after one disk has thus been forced out, the balls and disks, or any of them, may be removed readily through the opening 12—13.

If preferred, the last disk may be of the special form shown in Fig. 4 and which I term the "locking" key disk inasmuch as it serves to lock the balls and disks together and prevent their accidental displacement in the raceway, or their escape through the opening 12—13, but may be readily removed without appreciable force.

If desired the locking key disk may be milled, or otherwise marked, on its circumferential edge so that it may be readily identified and so that it may be the more readily rotated. Said special, or "locking key" disk is grooved or recessed radially as at 14ᵇ, to a depth about equal to the distance which the balls enter in the central opening of the disks, thus making it possible to enter said locking disk between the last two balls of the series or, it may be between the first and last balls inserted, dependent upon the manner in which the balls are placed, and after having thus inserted said locking disk it is partially rotated so to bring the grooved side 14ᵇ opposite the opening 12—13.

When the described ball bearing is in service the outer ring 10 revolves upon the inner ring and the notches 12—13 are never in fixed relation to each other so that the balls and separators cannot escape therethrough, even if said balls and separators were not interlocked with each other. When it is desired to remove the locking key disk the outer and inner rings may be adjusted, by careful and patient manipulation, into the position seen in Fig. 1; that is to say, so the notches 12—13 register with each other and so the locking key is directly opposite the full opening. The said locking key is then properly rotated and adjusted so to locate the recesses 14ᵇ at the backside of the raceway, when said locking key may be grasped by pliers, or the like suitable implement, and withdrawn from its position between the balls. The balls and separators may then be removed through the opening 12—13.

My described structure provides a strong, simple and serviceable ball bearing having a practically continuous or unbroken, raceway, whose several parts may be readily assembled or separated and, in the event that the balls or separator disks become worn, the backlash may be overcome by simply removing one of the disks and substituting therefor a disk made of slightly thicker material.

Having thus described my invention, I claim:—

The improved ball bearing described, comprising inner and outer ring members concentrically arranged with their confronting faces grooved to form a raceway and having notches upon their adjacent faces, balls in said raceway and non-elastic perforated disks between the balls, the perforations of said disks receiving portions of said balls and one of said disks having a radial recess to constitute a locking key, said locking key being interposed between the last ball and the next adjacent ball and partially rotatable to move the said recess out of register with the filling opening.

EDWIN OLDFIELD.

Witnesses:
  FRANK H. ALLEN,
  FRANK C. PALMER.